(12) United States Patent
Foley

(10) Patent No.: US 11,320,081 B1
(45) Date of Patent: May 3, 2022

(54) METHOD AND APPARATUS FOR DISCONNECTION OF HOSES AND OTHER CONDUITS

(71) Applicant: Foley Patents, LLC, Lafayette, LA (US)

(72) Inventor: Lawrence E. Foley, Lafayette, LA (US)

(73) Assignee: FOLEY PATENTS, LLC, Abbeville, LA (US)

( * ) Notice: Subject to any disclaimer, the term of this patent is extended or adjusted under 35 U.S.C. 154(b) by 146 days.

(21) Appl. No.: 16/839,499

(22) Filed: Apr. 3, 2020

Related U.S. Application Data

(60) Provisional application No. 62/829,241, filed on Apr. 4, 2019.

(51) Int. Cl.
| | |
|---|---|
| *F16L 37/62* | (2006.01) |
| *F16L 55/10* | (2006.01) |
| *F16L 29/02* | (2006.01) |
| *F16L 35/00* | (2006.01) |
| *F16L 37/00* | (2006.01) |

(52) U.S. Cl.
CPC .......... *F16L 55/1018* (2013.01); *F16L 29/02* (2013.01); *F16L 35/00* (2013.01); *F16L 37/002* (2013.01); *F16L 37/62* (2013.01)

(58) Field of Classification Search
CPC ..... F16L 37/62; F16L 37/002; F16L 55/1018; E21B 43/013
See application file for complete search history.

(56) References Cited

U.S. PATENT DOCUMENTS

| | | | | |
|---|---|---|---|---|
| 3,378,281 | A * | 4/1968 | Smith | F16L 1/26 |
| | | | | 285/27 |
| 3,737,181 | A * | 6/1973 | Low | F16L 37/133 |
| | | | | 285/316 |
| 7,402,000 | B2 * | 7/2008 | Bastesen | F16L 1/26 |
| | | | | 405/170 |
| 2009/0014184 | A1 * | 1/2009 | Voss | F16L 37/002 |
| | | | | 166/345 |
| 2011/0005764 | A1 * | 1/2011 | Bekkevold | E21B 43/013 |
| | | | | 166/344 |
| 2011/0025044 | A1 * | 2/2011 | McKay | E21B 33/038 |
| | | | | 285/80 |
| 2015/0083430 | A1 * | 3/2015 | Jahnke | E21B 33/038 |
| | | | | 166/338 |
| 2016/0362956 | A1 * | 12/2016 | Older | E21B 33/076 |
| 2017/0130871 | A1 * | 5/2017 | Bastesen | F16L 1/26 |
| 2017/0328164 | A1 * | 11/2017 | Partridge | E21B 33/076 |
| 2019/0293207 | A1 * | 9/2019 | Hande | F16L 53/32 |

* cited by examiner

*Primary Examiner* — Matthew Troutman
*Assistant Examiner* — James A Linford
(74) *Attorney, Agent, or Firm* — Ted M. Anthony

(57) ABSTRACT

A disconnect assembly for operationally attaching a hose or other fluid conduit to a fluid inlet and selectively decoupling the hose or conduit from the fluid inlet. In a first locked position, a fluid pressure seal is formed permitting pressurized flow of fluids through the disconnect assembly. In a second unlocked position, the hose or other fluid conduit can be quickly, safely and efficiently decoupled from the disconnect assembly such as, for example, during an emergency or unforeseen crisis. Following such decoupling, fluid is automatically contained and prevented from discharging into a surrounding environment.

13 Claims, 5 Drawing Sheets

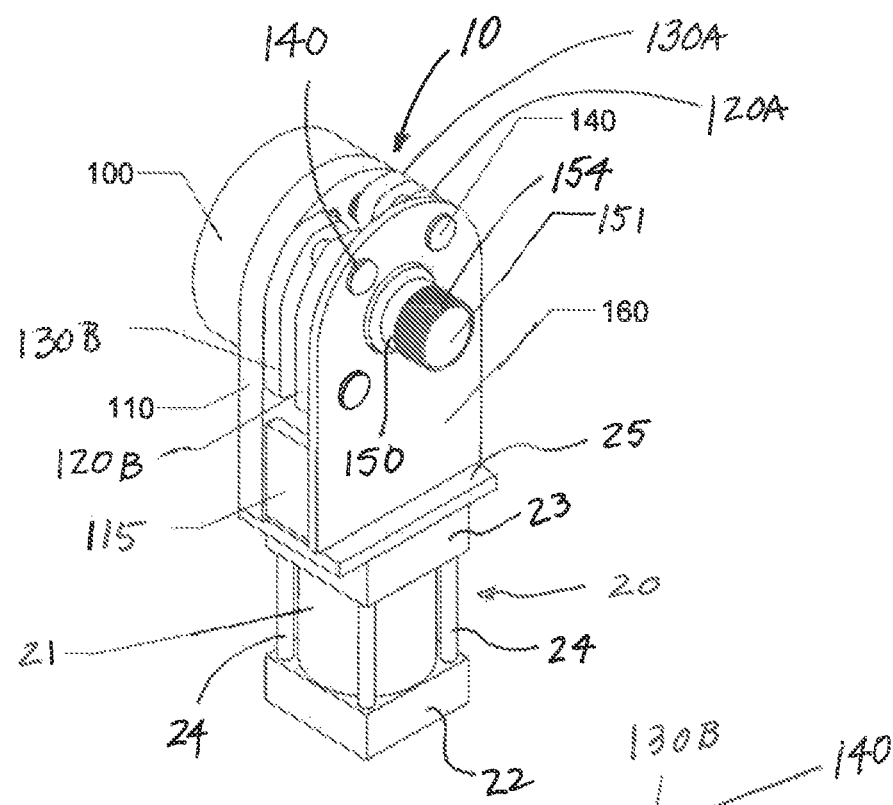
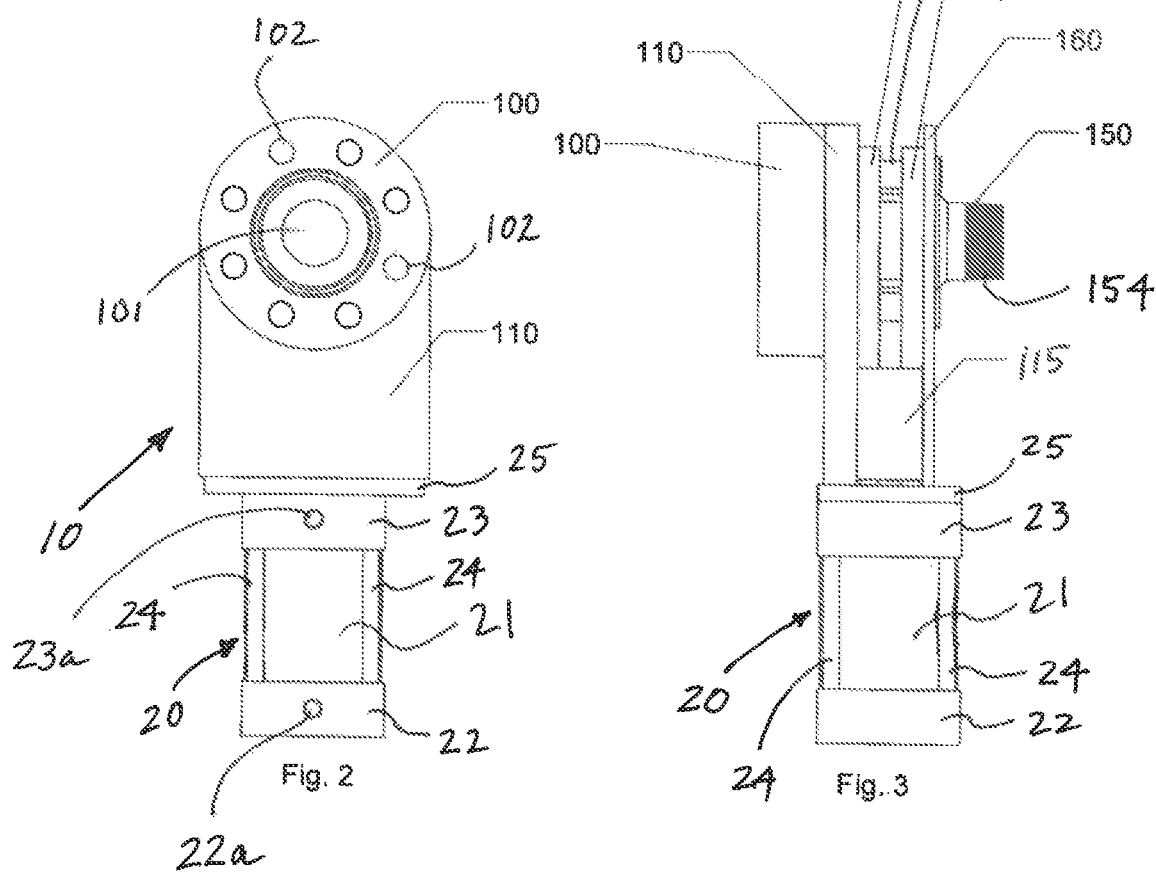
Fig. 1
Fig. 2
Fig. 3

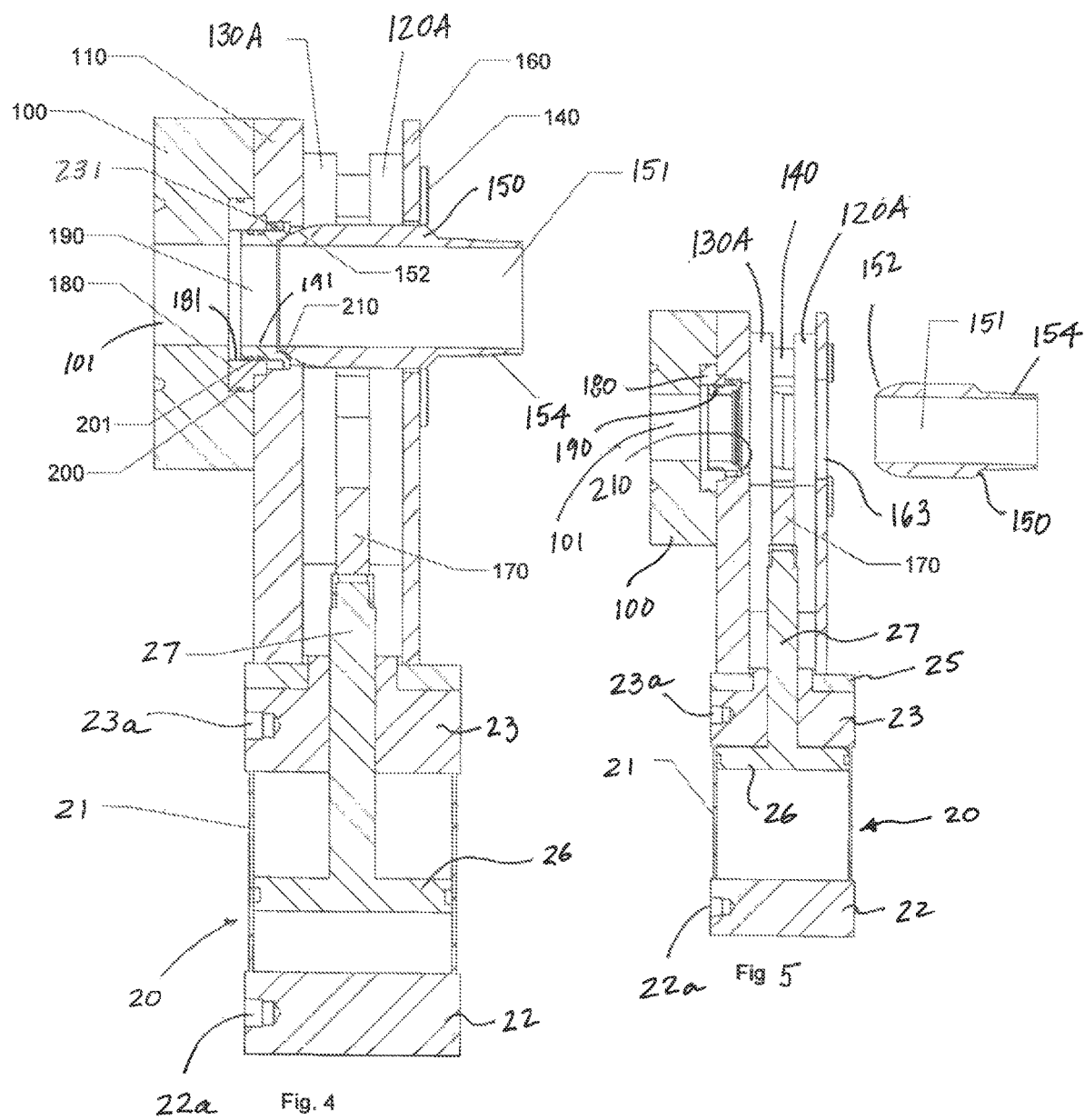

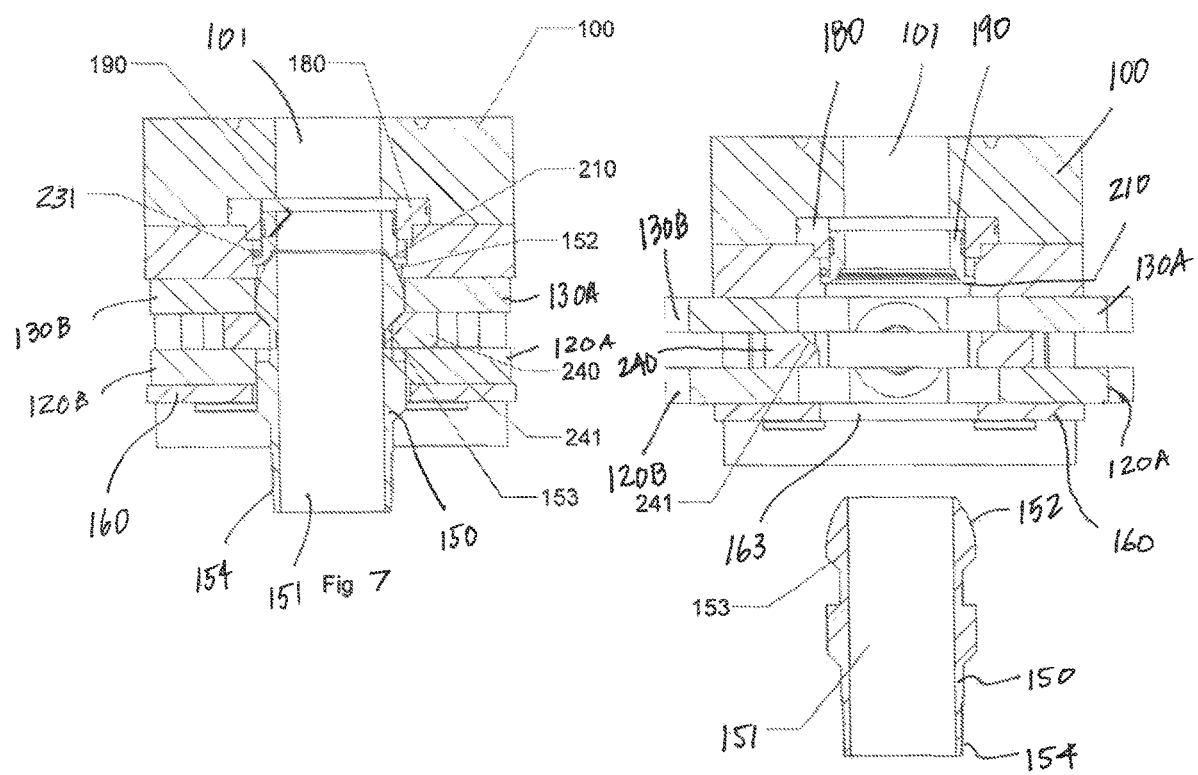

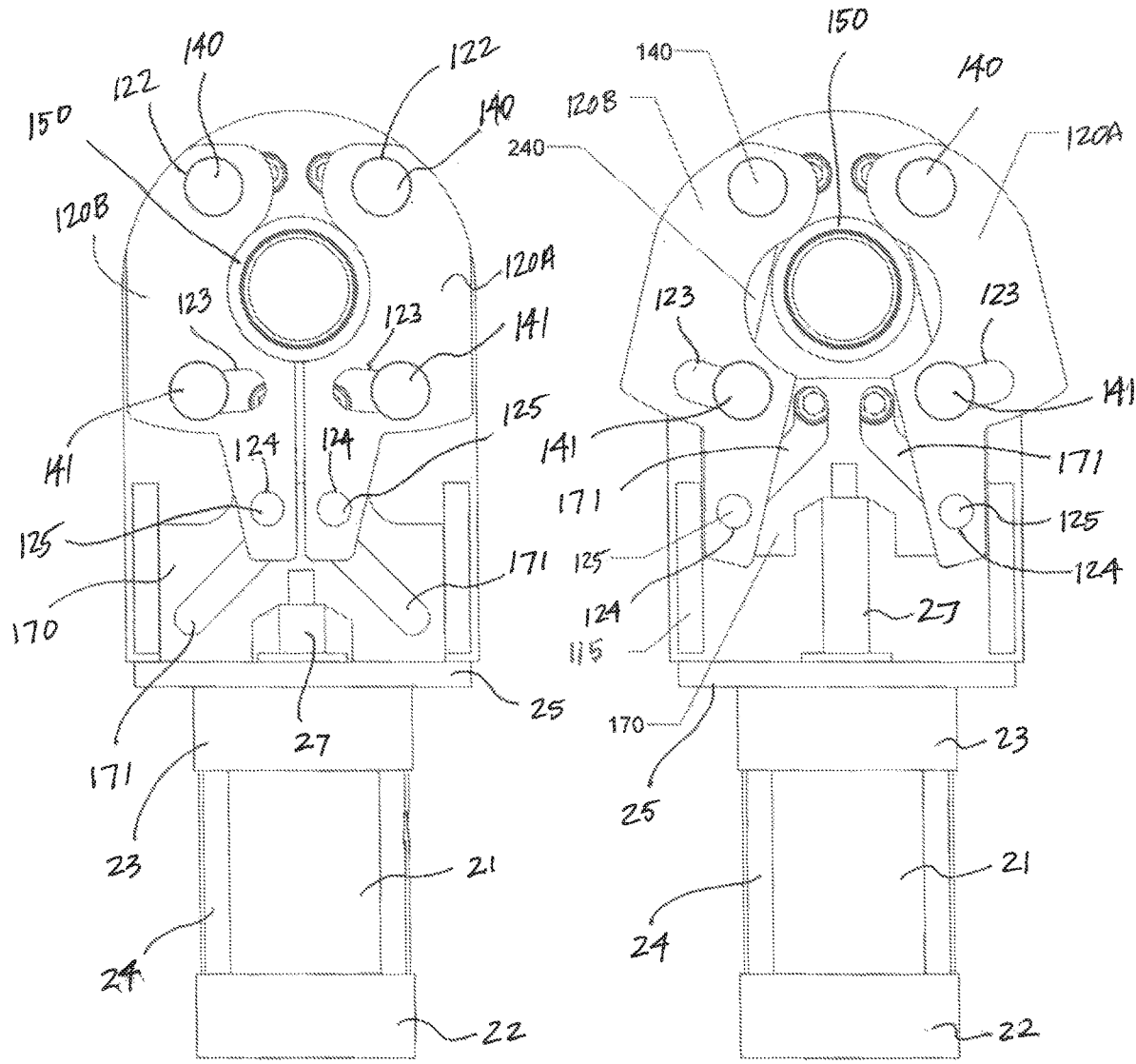

METHOD AND APPARATUS FOR DISCONNECTION OF HOSES AND OTHER CONDUITS

CROSS REFERENCES TO RELATED APPLICATIONS

This application claims priority of U.S. provisional patent application Ser. No. 62/829,241, filed Apr. 4, 2019, incorporated by reference herein.

STATEMENTS AS TO THE RIGHTS TO THE INVENTION MADE UNDER FEDERALLY SPONSORED RESEARCH AND DEVELOPMENT

NONE

BACKGROUND OF THE PRESENT INVENTION

1. Field of the Invention

The present invention pertains to a fluid conduit disconnect assembly. More particularly, the present invention pertains to an emergency disconnect assembly for use in quickly disconnecting at least one hose or fluid conduit from an attachment point. More particularly still, the present invention pertains to a hose disconnect assembly for use in quickly disconnecting at least one hose from a fluid receptacle during an emergency situation such as, for example, when a boat is required to pull away from an offshore platform or other facility.

2. Brief Description of the Prior Art

During certain operations, a hose or other fluid conduit can be operationally attached to a plurality of attachment or anchor points; said hose can extend between said points and can accommodate the flow of fluids through such conduit. For example, in certain oil and gas drilling operations, hoses frequently extend between a boat and a fluid inlet disposed on an offshore oil platform or other fixed structure. Frequently, pumps are installed on a boat and fluid is pumped through said hose from a boat to a fluid inlet receptacle located on said platform.

In such situations, a boat can be tethered to a fixed structure or platform; a hose typically extends between said boat and said fixed structure/platform to allow for the flow of fluids through said hose. However, in certain circumstances, such as when an unexpected or emergency situation arises, said boat must be able to quickly and safely move away from the structure/platform. As a result, the hose must be capable of being quickly disconnected from the boat and/or an attachment point (such as, for example, a fluid inlet receptacle) on said structure/platform, without causing damage to either said boat, said inlet receptacle or the hose/conduit. Additionally, uncontrolled leakage or discharge of fluids from said disconnected hose should be reduced and, ideally, eliminated entirely.

It is to be observed that a hose extending between a marine vessel and offshore platform is just one illustrative example. Other applications or situations may also exist wherein the quick and safe disconnection of a hose or other conduit from an attachment receptacle may desirable. In such cases, a hose or conduit extending between two points should be capable of remaining securely attached during use. When desired, at least one end of said hose or conduit should be capable of being selectively disconnected from an attachment point without damage to either said attachment point, the hose or conduit, or any end fittings thereon. Furthermore, uncontrolled leakage or discharge of fluids from said disconnected hose or conduit, or any attachment point, should be minimized or eliminated.

Thus, there is a need for a disconnect assembly that permits a hose or other conduit to be quickly and safely disconnected from an attachment point (such as a boat and/or fluid inlet receptacle on a fixed structure/platform) without causing damage to said hose, boat, fixed structure/platform or other equipment. Upon disconnection, said disconnect assembly should beneficially limit or restrict pollution from a disconnected hose or conduit, or attachment point, into the surrounding environment.

SUMMARY OF THE PRESENT INVENTION

In a preferred embodiment, a hose disconnect assembly of the present invention generally comprises a hose connection adapter, a receptacle or attachment assembly and an actuation (locking) assembly. Said hose connection adapter can be received within said receptacle assembly and selectively secured or locked in place using said actuation assembly. Alternatively, said hose connection adapter can be selectively released using said actuation assembly, thereby permitting disconnection of said hose connection adapter (and attached hose) from said receptacle assembly.

By way of illustration, but not limitation, said hose connection adapter can be connected to one or both distal ends of a hose that extends from a boat to a fixed structure or platform (or other boat or vessel). When a hose connection adapter is secured to said receptacle assembly using said actuation assembly, a fluid pressure seal is established between said hose connection adapter and said receptacle assembly. In this configuration, a fluid-tight flow path can be created using a hose extending between a boat and a fixed structure or platform, wherein said hose is attached to the hose disconnect assembly of the present invention.

Said actuation assembly comprises at least one rotating locking plate; in a preferred embodiment, said actuation assembly comprises a pair of opposed rotating locking plates. Said rotating locking plates are operationally attached to at least one sliding actuation plate that, in turn, is operationally attached to an extendable piston rod(s) of at least one fluid powered cylinder. Said at least one fluid powered cylinder can be selectively hydraulically or pneumatically actuated, thereby causing said extendable piston rod to selectively extend or retract.

Extension or retraction of said at least one fluid powered cylinder causes said at least one sliding actuation plate to translate which, in turn, causes said rotating locking plate(s) to shift between a first "locked" position and a second "unlocked" position. Although other orientations can be envisioned without departing from the scope of the present invention, in a preferred embodiment said at least one fluid powered cylinder can be disposed vertically so that extension of said piston rod causes said locking plates to shift to said unlocked position, and retraction of said piston rod causes said locking plates shift to said locked position.

In a preferred embodiment, the disconnect assembly of the present invention may be fixed to a skid or other means which is attached to a boat. During operation, a hose or other conduit can be operationally attached to a hose connection adapter; said hose connection adapter can then be received within said receptacle assembly and selectively secured or locked in place using said actuation assembly. When disconnection of a hose between a boat and fixed structure is desired (such as, for example, during an emergency situation), said actuation assembly can be selectively actuated, thereby unlocking said hose connection adapter from said receptacle assembly and permitting removal of said hose connection assembly.

In this manner, a connected hose or other conduit can be quickly and safely disconnected from said receptacle assembly, without causing damage to said hose, a boat, inlet receptacle, fixed structure/platform or other surrounding equipment. Upon disconnection, check valves in said hose adapter and/or receptacle assembly beneficially limit or restrict pollution from being expelled from a disconnected hose or conduit into the surrounding environment.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 1 depicts a side perspective view of a preferred embodiment of a hose disconnect assembly of the present invention.

FIG. 2 depicts a front orthogonal view of a hose disconnect assembly of the present invention.

FIG. 3 depicts a side orthogonal view of a preferred embodiment of a hose connection adapter of the hose disconnect assembly of the present invention in an operationally connected configuration.

FIG. 4 depicts a side sectional view of a preferred embodiment of a hose connection adapter of the hose disconnect assembly of the present invention in an operationally connected configuration.

FIG. 5 depicts a side sectional and exploded view of a preferred embodiment of a hose disconnect assembly.

FIG. 7 depicts a top sectional view of a hose connection adapter of the hose disconnect assembly of the present invention in an operationally connected configuration.

FIG. 8 depicts a top sectional view of a hose connection adapter of the hose disconnect assembly of the present invention in an exploded configuration.

FIG. 9 depicts a front view of a preferred embodiment of a hose disconnect assembly of the present invention with rotating locking plates in a first locked position (with an outer fixed plate removed for clarity).

FIG. 10 depicts a front view of a preferred embodiment of a hose disconnect assembly of the present invention with rotating locking plates in a second unlocked position (with an outer fixed plate removed for clarity).

DETAILED DESCRIPTION OF A PREFERRED EMBODIMENT

Figure 6:
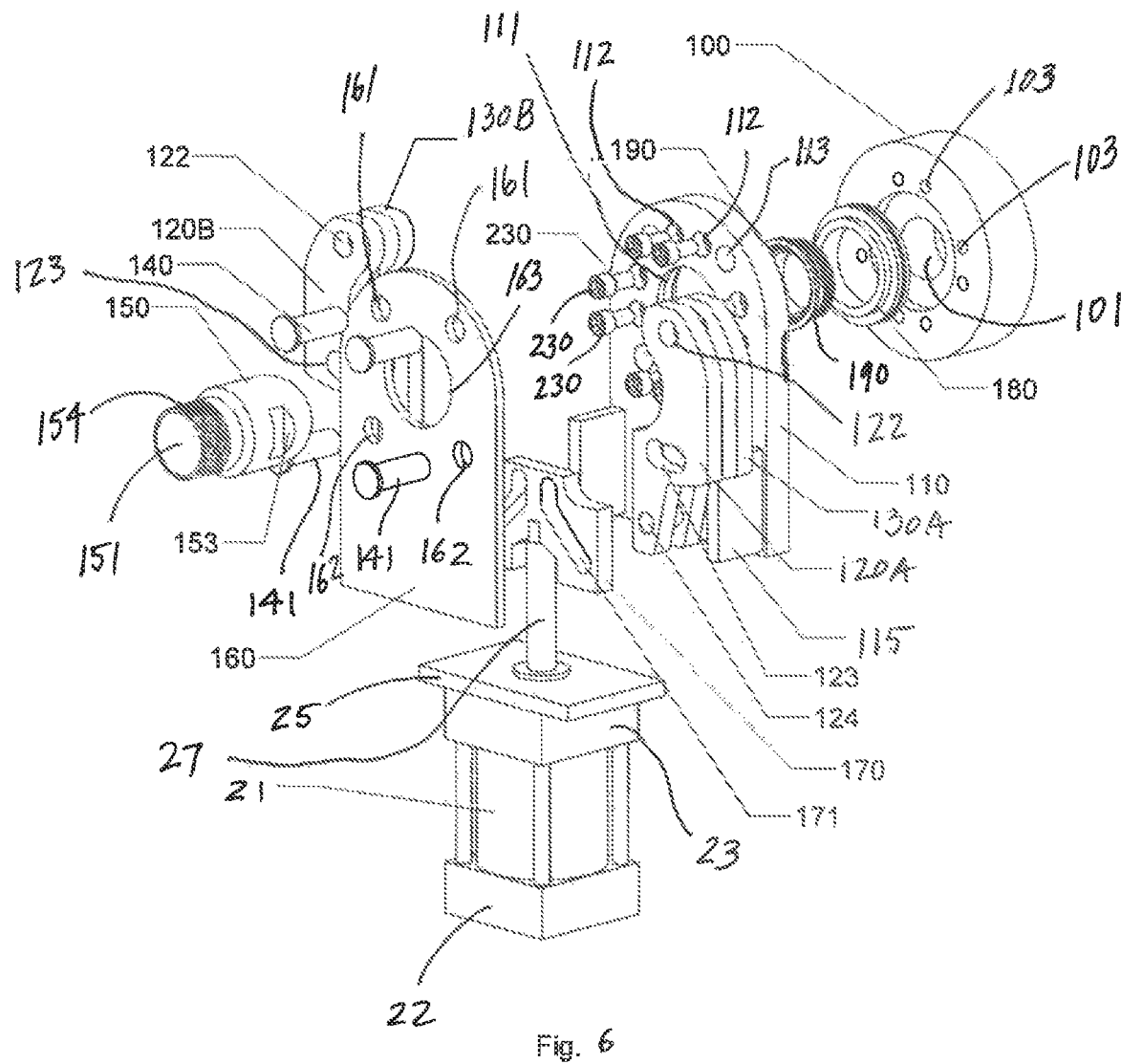
FIG. 6 depicts a side perspective and exploded view of a hose disconnect assembly of the present invention.

Referring to the drawings, FIG. 1 depicts a side perspective view of a preferred embodiment of a hose disconnect assembly 10 of the present invention. As depicted in FIG. 1, hose disconnect assembly 10 generally comprises actuator assembly 20, connection flange 100 and hose connection adapter 150. Hose connection adapter 150 has central through bore 151 and external threads 154. In FIG. 1, hose connection adapter 150 is depicted in the connected and locked configuration.

Hose disconnect assembly 10 further comprises an inner fixed plate 110 and an outer fixed plate 160; said inner fixed plate 110 and outer fixed plate 160 are operationally connected to each other using guide plate 115 to define a housing or support structure. Inner fixed plate 110 is also attached to outer fixed plate 160 by upper pins 140. In a preferred embodiment, said inner fixed plate 110 and outer fixed plate 160 are oriented substantially parallel to each other, and are spaced apart to define a gap or space there between.

Rotating locking plates 120 (comprising opposing locking plates 120A and 120B) and 130 (comprising opposing locking plates 130A and 130B) are pivotally disposed in said gap between inner fixed plate 110 and outer fixed plate 160. In a preferred embodiment, said rotating locking plates 120A, 120B, 130A and 130B are oriented substantially parallel to inner fixed plate 110 and outer fixed plate 160 and are moveably disposed in the gap formed between said inner fixed plate 110 and outer fixed plate 160. Said rotating locking plates 120A, 120B, 130A and 130B each rotate about an upper pin 140; said pins 140 are oriented substantially perpendicular to said rotating locking plates 120 and 130.

In a preferred embodiment, actuator assembly 20 comprises a fluid powered cylinder (having barrel 21) mounted on a support frame generally comprising base 22, cap member 23, support plate 25 and structural support columns 24. In a preferred embodiment, said fluid powered cylinder comprises a pneumatically actuated cylinder; however, it is to be observed that said fluid powered cylinder can be hydraulically powered. Alternatively, in certain applications, another type of linear actuator can be used in place of said fluid powered cylinder (such as, for example, an electric linear actuator or screw drive actuator) without departing from the scope of the present invention.

Hose disconnect assembly 10 of the present invention generally comprises a point of operational attachment (such as, for example, on a fixed platform or other marine facility) for a hose or other fluid conduit that can, in turn, be connected to a pump or other fluid handling equipment (such as, for example, fluid storage tanks located on a boat or other movable vessel). A connected hose or other conduit can be quickly and safely disconnected using said hose disconnect assembly 10 without causing damage to said hose, a boat, receptacle, fixed structure/platform or other surrounding equipment. Upon disconnection, at least one check valve can beneficially limit or restrict liquids from being expelled from a disconnected hose or conduit into the surrounding environment.

FIG. 2 depicts a front orthogonal view of a hose disconnect assembly 10 of the present invention. As depicted in FIG. 2, hose disconnect assembly 10 comprises inner fixed plate 110, actuator assembly 20 and hose connection adapter 150. Although not visible in FIG. 2, inner fixed plate 110 and outer fixed plate 160 are operationally attached using guide plate 115. Connection flange 100 having central through bore 101 and a plurality of bolt holes 102 is operationally attached to inner fixed plate 110. Actuator assembly 20 comprises a fluid powered cylinder 21, base 22, cap member 23, support plate 25 and structural support columns 24. Base 22 has at least one fluid port 22a while cap member 23 has at least one fluid port 23a; said fluid ports 22a and 23a are well known to those having skill in the art of operation of fluid powered cylinders.

FIG. 3 depicts a side orthogonal view a hose disconnect assembly 10 of the present invention, generally comprising actuator assembly 20, connection flange 100 and hose connection adapter 150. Hose connection adapter 150 is depicted in the connected and locked position within hose disconnection assembly 10. In a preferred embodiment, said hose connection adapter 150 has central through bore 151 as well as external connection threads 154. It is to be observed that connection threads 154 can be used to threadedly connect a hose or other fluid conduit to hose connection adapter 150. Alternatively, instead of threads 154, connection adapter 150 can comprise a weld preparation or connection flange that can similarly be used for connection to the distal end of a hose or other fluid conduit.

Actuator assembly 20 comprises a fluid powered cylinder having cylinder barrel 21 mounted on a support frame generally comprising base 22, cap member 23, support plate 25 and structural support columns 24. Inner fixed plate 110 and outer fixed plate 160 are mounted on support plate 25 and operationally connected to each other using guide plate 115, as well as transverse pins 140.

Rotating locking plates 120B and 130B are pivotally disposed between inner fixed plate 110 and outer fixed plate 160. In a preferred embodiment, said rotating locking plates 120B and 130B are oriented substantially parallel to inner fixed plate 110 and outer fixed plate 160. Each of said rotating locking plates 120B and 130B rotate about a pin 140; said pins 140 are oriented substantially perpendicular to said rotating locking plates 120B and 130B. Although not visible in FIG. 3, it is to be understood that rotating locking plates 120A and 130A are also pivotally disposed between inner fixed plate 110 and outer fixed plate 160.

FIG. 4 depicts a side sectional view of a preferred embodiment of hose disconnect assembly 10 of the present invention. Hose disconnect assembly 10 generally comprises actuator assembly 20, connection flange 100 and hose connection adapter 150. Hose connection adapter 150 has central through bore 151 and external threads 154 and is depicted in the connected and locked configuration in FIG. 4.

Hose disconnect assembly 10 further comprises an inner fixed plate 110 and an outer fixed plate 160; said inner fixed plate 110 and outer fixed plate 160 are operationally connected to each other using guide plate 115 to define a housing or support structure. Inner fixed plate 110 is also attached to outer fixed plate 160 by upper pins 140. Said inner fixed plate 110 and outer fixed plate 160 are oriented substantially parallel to each other, and are spaced apart to define a gap or space there between.

In a preferred embodiment, actuator assembly 20 comprises a fluid powered cylinder having cylinder barrel 21 mounted on a support frame generally comprising base 22, cap member 23, support plate 25 and structural support columns 24. Piston 26 can travel within cylinder barrel 21 along the longitudinal axis of said cylinder barrel 21. Piston rod 27 is operationally attached to said piston 26; it is to be observed that said piston rod 27 can selectively extend or retract relative to cylinder barrel 21. Sliding plate 170 is disposed at the distal end of moveably piston rod 27, and can selectively translate with extension and retraction of piston rod 27.

Seal ring adapter 180 is disposed between connection flange 100 and inner fixed plate 110; in a preferred embodiment, said connection flange 100 and inner fixed plate 110 include recessed bore areas that are generally positioned in alignment with each other. Outer diameter surfaces of said seal adapter 180 fit within said aligned recessed bore areas of connection flange 100 and inner fixed plate 110. At least one elastomeric sealing element 200—such as an O-ring—is disposed along the outer surface(s) of said seal adapter 180 and forms a fluid pressure seal against the recessed bore of connection flange 100.

Seat member 190 is partially and moveably disposed within inner bore 181 of seal adapter 180. At least one elastomeric sealing element 201 (such as an O-ring) is disposed along the outer diameter surface(s) of said seat member 190 and forms a fluid pressure seal against inner bore 181 of seal adapter 180. In a preferred embodiment, seat member 190 further comprises a resilient seal ring member 210. Compression spring 231 is disposed between seat member 190 and seal adapter 180.

Still referring to FIG. 4, hose connection adapter 150 is depicted in the locked position and, therefore, is restrained from axial translation or movement. Leading end of connection adapter 150 has a rounded or convex surface 152. Spring 231 biases resilient seal 210 of seat member 190 against convex surface 152 of connection adapter 150, thereby effecting a fluid pressure seal between said seat member 190 (and, more specifically, resilient seal 210 thereof) and surface 152 of outlet adapter 150. The outer diameter of seat member 190, which forms a fluid pressure seal against the surface of inside bore 181 of seal adapter 180, is larger than the diameter of resilient seal ring 210. As such, fluid pressure within aligned through-bores of hose disconnect assembly 10 (and, more specifically, bore 151 of hose connection adapter 150, bore 101 of connection flange 100, bore 181 of seat adapter 180 and central bore 191 of seat member 190) exerts additional force to engage resilient seal ring 210 against convex surface 152 of connection adapter 150.

FIG. 5 depicts a side sectional and exploded view of a preferred embodiment of a hose disconnect assembly 10 of the present invention. As depicted in FIG. 5, connection adapter 150, which can be connected to a hose or other fluid conduit (not pictured) is shown in the detached or disconnected position. Piston rod 27 is operationally attached to said piston 26; it is to be observed that said piston rod 27 can selectively extend or retract relative to cylinder barrel 21. As depicted in FIG. 5, piston rod 27 is substantially fully extended, thereby causing sliding plate 270 to shift to the fully extended (upward) position.

In this configuration, hose connection adapter 150 is depicted in the unlocked position. As a result, said connection adapter 150 is not restrained from axial translation or movement. Further, in this configuration resilient seal ring 210 is not engaged against convex surface 152 of connection adapter 150, and said connection adapter 150 is free to decouple or disconnect from the remainder of disconnect assembly 10 via removal from central bore 163 of outer plate 160.

FIG. 6 depicts a side perspective and exploded view of a hose disconnect assembly 10 of the present invention. Connection flange 100 is connected to inner fixed plate 110 having central through bore 111 using cap screws 230 received in bores 112 of plate 110 and bores 103 of connection flange 100. Outer fixed plate 160 has central bore 163. Upper pins 140 are disposed within aligned upper holes 113 in inner fixed plate 110 and upper holes 161 in outer fixed plate 160. Upper pins 140 are received within holes 122 of rotating locking plates 120A and 120B, and rotating locking plates 130A and 130B, such that each of said rotating locking plates 120A, 120B, 130A and 130B are all configured to rotate about one of said upper pins 140.

Similarly, lower pins 141 are disposed through lower holes 162 in outer fixed plate 160 and received within slots 123 of rotating locking plates 120A and 130A, as well as 120B and 130B. Sliding plate 170 is disposed between rotating locking plates 120A and 120B (on one side of sliding plate 170), and rotating plates 130A and 130B (on the other side of sliding plate 170). Sliding plate 170 further has a plurality of angled slots 171. Pins 125 (visible in FIGS. 9 and 10, but not visible in FIG. 5) extend through bores 124 and angled slots of said rotating plates. Said pins engage within slots 171 of sliding plate 170; as such, translation of sliding plate 170 (resulting from selective extension or retraction of piston rod 27) in turn causes rotating locking plates 120A and 130A to rotate about a first upper pin 140, and 120B and 130B to rotate about a second upper pin 140. Hose connection adapter 150 has central through bore 151, external threads 154 and at least one lateral external tapered slot 153.

FIG. 7 depicts a top sectional view of a hose connection adapter 150 of the hose disconnect assembly of the present invention in an operationally connected configuration, while FIG. 8 depicts a top sectional view of said hose connection adapter 150 of the hose disconnect assembly of the present invention in detached or disconnected configuration. Hose connection adapter 150 has central through bore 151, external threads 154 and lateral external tapered slot 153.

As shown in FIG. 7, when opposing locking plates 120A and 120B on one side, and 130A and 130B on an opposite side, are rotated inward in a locked position, tapered surfaces 241 of tapered plates 240 engage against tapered surfaces of tapered slot 153 of hose connection adapter 150. As such, hose connection adapter 150 is restrained from axial translation in the direction of outer plate 160, and is restrained from removal through bore 163 of outer plate 160. Further, said tapered plates 240 apply axial force to hose connection adapter 150 in the general direction of seat member 190, causing resilient seal 210 to engage against convex surface 152 of hose connection adapter 150 to form a fluid pressure seal.

As depicted in FIG. 8, when opposing locking plates 120A and 120B, and 130A and 130B, are rotated outward in an unlocked position, tapered plates 240 are also rotated outward away from hose connection adapter 150. In this configuration, tapered surfaces 241 do not engage against tapered slot 153 of hose connection adapter 150. As such, hose connection adapter 150 is free to disconnect and be removed through bore 163 of outer plate 160.

FIG. 9 depicts a front view of a preferred embodiment of hose disconnect assembly 10 of the present invention with rotating locking plates 120A and 120B in a first locked position (with outer fixed plate 160 removed for clarity). FIG. 10 depicts a front view of a preferred embodiment of hose disconnect assembly 10 of the present invention with rotating locking plates 120A and 120B in a second unlocked position (with outer fixed plate 160 removed for clarity).

Upper pins 140 are received within holes 122 of rotating locking plates 120A and 120B (as well as rotating locking plates 130A and 130B, not visible in FIGS. 9 and 10). Locking plate 120A (and 130A) is configured to rotate about one of said upper pins 140, while locking plate 120B (and 130B) is configured to rotate another of said upper pins 140.

Similarly, lower pins 141 are received within slot 123 of rotating locking plates 120A (and 130A, not visible in FIGS. 9 and 10) as well as slot 123 of rotating locking plates 120B (and 130B, not visible in FIGS. 9 and 10). Sliding plate 170 has a plurality of angled slots 171. Pins 125 extend through bores 124 of said rotating plates and angled slots 171 of sliding plate 170. Said pins 125 engage within slots 171 of sliding plate 170; as such, translation of sliding plate 170 (resulting from selective extension or retraction of piston rod 27) in turn causes rotating locking plates 120A (and 130A) to rotate about a first upper pin 140, and 120B (and 130B) to rotate about a second upper pin 140. Hose connection adapter 150 is positioned between said opposing rotating plates 120A and 120B.

As depicted in FIG. 9, cylinder rod 27 is retracted, causing sliding plate 170 to move generally in the direction toward plate 125. As said sliding plate 170 moves axially with piston rod 27, pins 125 travel within and engage against slots 171. Such engagement of pins 125 with angled slots 171 causes rotating locking plates 120A and 120B to converge inward by rotating (in a clockwise direction in FIG. 9) about upper pins 140. In this locked position, as also depicted in detail in FIG. 7, tapered plate 240 engages against tapered slot 153 of hose connection adapter 150 thereby causing hose connection adapter 150 to be restrained from axial translation (such as, for example, removal through central bore 163 of outer plate 160, not pictured in FIG. 9). Further, as best seen in FIG. 7, said tapered plates 240 apply axial force to hose connection adapter 150 in the general direction of seat member 190, thereby causing resilient seal 210 to engage against convex surface 152 of hose connection adapter 150 to form a fluid pressure seal.

As depicted in FIG. 10, cylinder rod 27 can be selectively extended, causing sliding plate 170 to move generally in the direction away from plate 125. As said sliding plate 170 moves axially with piston rod 27, pins 125 travel within and engage against angled slots 171. Such engagement of pins 125 with angled slots 171 causes rotating locking plates 120A and 120B to spread or flare outward by rotating (in a generally counter-clockwise direction in FIG. 10) about upper pins 140. In this unlocked position, as depicted in detail in FIG. 8, tapered plate 240 do not engage against tapered slot 153 of hose connection adapter 150 thereby removing restriction of hose connection adapter 150. As such, hose connection 150 is free to be selectively disconnected and, as best seen in FIG. 8, removed from bore 163 of outer plate 160.

In operation, hose connection adapter 150 can be attached to the distal end of a hose or other fluid conduit. Said hose connection adapter 150 can be selectively inserted within bore 163 of outer plate 160. Referring to FIG. 9, piston rod 27 can be selectively retracted, causing sliding plate 170 to translate. As said sliding plate 170 moves axially with piston rod 27, pins 125 travel within and engage against slots 171. Engagement of pins 125 with angled slots 171 causes rotating locking plates 120A and 120B to converge inward by rotating (in a clockwise direction in FIG. 9) about upper pins 140.

As depicted in detail in FIG. 7, tapered plate 240 engages against tapered slot 153 of hose connection adapter 150 thereby causing hose connection adapter 150 to be locked in place and restrained from axial translation. Further, said tapered plates 240 apply axial force to hose connection adapter 150 in the general direction of seat member 190, thereby causing resilient seal 210 to engage against convex surface 152 of hose connection adapter 150 and form a fluid pressure seal between said hose connection adapter 150 and seat member 190. As such, a pressure-sealed fluid pathway is formed through a hose, attached hose connection adapter 150, other components of hose disconnect assembly 10 and any piping or conduit attached to flange connector 100.

When disconnection is desired, cylinder rod 27 can be selectively extended. Referring to FIG. 10, as sliding plate 170 moves axially with piston rod 27, pins 125 again travel within and engage against angled slots 171. Such engagement of pins 125 with angled slots 171 causes rotating locking plates 120A and 120B to spread or flare outward by rotating (in a generally counter-clockwise direction in FIG. 10) about upper pins 140.

As depicted in detail in FIG. 8, in this unlocked position tapered plate 240 do not engage against tapered slot 153 of hose connection adapter 150, thereby removing restriction of hose connection adapter 150. As such, hose connection 150 is no longer restrained from axial translation and is free to be selectively disconnected and, as best seen in FIG. 8, removed from bore 163 of outer plate 160. In his manner, a hose connected to hose connection adapter 150 can be selectively disconnected from other components of hose disconnect assembly 10, and an attached boat or vessel can move away from a platform or other marine facility without uncontrolled breakage or parting of said hose.

One advantage of the present invention is that the fluid pressure seal between the internal seat and hose connection adapter 150 is maintained. In operation, an attached hose or fluid conduit exerts side loads on the said hose connection adapter. In conventional solutions, the bore of the seat and the outside diameter of a hose adapter are cylindrical, with O-ring seals between the inside and outside diameters. As such, such side loads (typically caused by a hose or fluid conduit) exert radial loads between the inside and outside diameters of the seat and hose adapter. Such radial loads may cause a conventional hose adapter to bind within a seat and prevent said conventional hose adapter from translating free of the seat. Further, deflection of the sealing cylindrical surfaces may cause excessive wear and leakage.

Another advantage of the present invention is that the rotating plates completely disengage the hose connection adapter 150 in the unlocked position. In conventional solutions, the cylindrical outer diameter of a hose adapter translates within the cylindrical inner diameter of a body as a hose adapter disconnects. Side loads (typically from a hose or conduit) often cause interfacing cylindrical surfaces to bind, thus preventing a hose adapter from disconnecting.

Hose disconnect assembly 10 of the present invention generally comprises a point of operational attachment between a fluid inlet system (such as, for example, a fluid manifold or fluid storage system on a fixed platform or other marine facility) with a hose or other fluid conduit that can, in turn, be connected to a pump or other fluid handling equipment (such as, for example, fluid storage tanks located on a boat or other movable vessel). It is to be observed that said fluid inlet can be operationally attached to connector 100 of hose disconnect assembly 10, while hose connection adapter 150 can be operationally attached to the distal end of a hose or fluid conduit.

A connected hose or other conduit can be quickly and safely disconnected using said hose disconnect assembly 10 without causing damage to said hose, a boat, receptacle, fixed structure/platform or other surrounding equipment. Upon disconnection, at least one check valve can beneficially limit or restrict liquids from being expelled from a disconnected hose or conduit, and/or a fluid inlet system, into the surrounding environment. Further, actuation of said hose disconnect assembly 10 (including, without limitation, functioning of actuation assembly 20), can be controlled at or near disconnection assembly 10, or from a remote location (such as from a boat or remote operation facility) using remote control devices well known to those having skill in the art.

An optional release means can comprise a cable or other connector extending from a desired anchor point on a hose or conduit to an actuation switch configured to trigger actuation assembly 20. In one embodiment, said switch can comprise a plate, having a hole or anchor point, slidably disposed at or near said actuation assembly 20. In the event that said hose becomes taught (such as when a boat or other vessel moves away from hose disconnect assembly 10), said cable will trigger said actuation switch (such as, for example, by pulling the horizontal plate) which, in turn, causes actuation assembly 20 to function, thereby allowing hose connection adapter 50 to be released in the manner discussed above. Importantly, such actuation and disconnection will beneficially occur "automatically" before a hose is completely stretched out or at risk of uncontrolled parting or separation along the length of said hose.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for selectively connecting and disconnecting a hose comprising:
   a) an adapter configured to attach to a hose;
   b) a first plate having a first central bore configured to receive said adapter;
   c) a second plate having a second central bore, wherein said first and second plates are oriented in parallel relationship and are spaced apart to define a gap;
   d) a first locking member, wherein said first locking member is at least partially disposed within said gap and pivots about a pivot axis that is perpendicular to said first and second plates;
   e) a second locking member, wherein said second locking member is at least partially disposed within said gap and pivots about a pivot axis that is perpendicular to said first and second plates; and
   f) an actuator configured to selectively move said first and second locking members between a first locked position and a second unlocked position, wherein said adapter is restrained from removal through said first central bore when said first and second locking members are in said first locked position, and said adapter is not restrained from removal through said first central bore when said first and second locking members are in said second unlocked position.

2. The apparatus of claim 1, further comprising:
   a) a sliding plate having a plurality of slots, wherein said sliding plate is attached to said actuator and disposed within said gap;
   b) a first pin operationally connected to said first locking member and disposed within a first slot in said sliding plate; and
   c) a second pin operationally connected to said second locking member and disposed within a second slot in said sliding plate.

3. The apparatus of claim 1, wherein said adapter has at least one tapered surface, said first or second locking member has at least one tapered surface, and said at least one tapered surface of said first or second locking member engages against said at least one tapered surface of said adapter in said first locked position, and applies axial force to said adapter.

4. The apparatus of claim 3, wherein said application of axial force is configured to form a fluid pressure seal between said adapter and an adjoining sealing member.

5. The apparatus of claim 4, wherein said fluid powered cylinder comprises a pneumatic cylinder or a hydraulic cylinder.

6. The apparatus of claim 5, further comprising a check valve disposed in said adapter, said connection flange, or both.

7. The apparatus of claim 1, wherein said first and second central bores are aligned.

8. The apparatus of claim 1, wherein said actuator comprises a fluid powered cylinder.

9. The apparatus of claim 1, wherein said first and second locking plates comprise opposing concave members.

10. The apparatus of claim 1, further comprising a connection flange operationally attached to said second member.

11. A method for attaching a hose to a fluid inlet comprising:
  a) attaching an adapter to an end of a hose;
  b) providing a hose disconnection assembly in fluid connection with said fluid inlet, said disconnection assembly comprising:
    i) a first plate having a first central bore configured to receive said adapter;
    ii) a second plate having a second central bore, wherein said first and second plates are oriented in parallel relationship and are spaced apart to define a gap;
    iii) a first locking member, wherein said first locking member is at least partially disposed within said gap and pivots about a pivot axis that is perpendicular to said first and second plates;
    iv) a second locking member, wherein said second locking member is at least partially disposed within said gap and pivots about a pivot axis that is perpendicular to said first and second plates; and
    v) an actuator configured to selectively move said first and second locking members between a first locked position and a second unlocked position;
  c) inserting said adapter in said first central bore of said first plate;
  d) shifting said first and second locking members from said second unlocked position to said first locked position, wherein said adapter is restrained from axial movement when said first and second locking members are in said first locked position.

12. The method of claim 11, further comprising shifting said first and second locking members from said first locked position to said second unlocked position, wherein said adapter is not restrained from axial movement when said first and second locking members are in said second unlocked position.

13. The method of claim 12, further comprising removing said adapter through said first central bore of said first plate.

* * * * *